United States Patent
Koch et al.

(10) Patent No.: US 10,389,507 B2
(45) Date of Patent: Aug. 20, 2019

(54) SYSTEM FOR POWER TRANSFER AND DUPLEX COMMUNICATION VIA SINGLE ISOLATION DEVICE

(71) Applicant: Analog Devices Global, Hamilton (BM)

(72) Inventors: Andreas Koch, Wiesbaden (DE); Stefan Hacker, München (DE)

(73) Assignee: Analog Devices Global, Hamilton (BM)

( * ) Notice: Subject to any disclaimer, the term of this patent is extended or adjusted under 35 U.S.C. 154(b) by 182 days.

(21) Appl. No.: 15/296,653

(22) Filed: Oct. 18, 2016

(65) Prior Publication Data

US 2017/0111162 A1   Apr. 20, 2017

Related U.S. Application Data

(60) Provisional application No. 62/244,058, filed on Oct. 20, 2015.

(51) Int. Cl.
*H04B 5/00* (2006.01)
*H04L 5/14* (2006.01)
(Continued)

(52) U.S. Cl.
CPC ............ *H04L 5/14* (2013.01); *H04B 3/542* (2013.01); *H04B 3/56* (2013.01); *H04B 5/005* (2013.01);
(Continued)

(58) Field of Classification Search
CPC .......... H04B 5/0037; H04B 5/005; H04L 5/14
(Continued)

(56) References Cited

U.S. PATENT DOCUMENTS

| 3,652,876 | A | * | 3/1972 | Baum | ..................... H04L 27/24 |
| | | | | | 327/184 |
| 3,798,608 | A | * | 3/1974 | Huebner | ............... H04L 12/423 |
| | | | | | 327/304 |

(Continued)

FOREIGN PATENT DOCUMENTS

| GB | 2467857 A | 8/2018 |
| WO | 2017068418 | 4/2017 |

OTHER PUBLICATIONS

"International Application Serial No. PCT IB2016 001602, International Preliminary Report on Patentability dated May 3, 2018", 8 pgs.

(Continued)

*Primary Examiner* — Emmanuel Bayard
(74) *Attorney, Agent, or Firm* — Schwegman Lundberg & Woessner, P.A.

(57) ABSTRACT

Techniques for duplex communication and power transfer across an isolator are provided. In an example, a first transceiver coupled to a first side of an isolator can include a transmit modulator configured to receive first data and timing signals, to provide control signals to oscillate an output of the transceiver to transmit power and to order each half-cycle of an oscillation cycle of the output to transmit the first data. A second transceiver coupled to a second side of the isolator can include a receive detection circuit configured to compare a received oscillation cycle with a plurality of thresholds and to provide a plurality of comparator outputs indicative of reception of the positive half-cycle and the negative half-cycle, and a receive decoder configured to identify the order of half-cycles and to provide an output indicative of logic level of the first data.

12 Claims, 4 Drawing Sheets

(51) Int. Cl.
*H04B 3/54* (2006.01)
*H04B 3/56* (2006.01)
*H04L 25/49* (2006.01)

(52) U.S. Cl.
CPC ....... *H04B 5/0037* (2013.01); *H04L 25/4904* (2013.01); *H04B 2203/542* (2013.01); *H04B 2203/5412* (2013.01); *H04B 2203/5483* (2013.01)

(58) Field of Classification Search
USPC .......................................... 375/257, 219–220
See application file for complete search history.

(56) References Cited

U.S. PATENT DOCUMENTS

| | | | | |
|---|---|---|---|---|
| 4,326,287 | A * | 4/1982 | Abramson | H04L 5/1476 370/276 |
| 4,901,215 | A * | 2/1990 | Martin-Lopez | H02M 3/28 363/21.05 |
| 4,922,249 | A * | 5/1990 | Cointot | H03M 5/18 327/170 |
| 5,138,254 | A * | 8/1992 | Wright | G01R 19/22 324/119 |
| 5,145,131 | A * | 9/1992 | Franke | B61L 1/188 246/122 R |
| 5,586,054 | A * | 12/1996 | Jensen | G01R 31/11 324/512 |
| 5,914,869 | A * | 6/1999 | Troiano | H02M 7/217 307/110 |
| 6,246,593 | B1 * | 6/2001 | Cheng | H02M 3/33592 363/127 |
| 8,174,206 | B2 * | 5/2012 | Hsueh | H05B 37/0263 315/291 |
| 8,928,383 | B2 * | 1/2015 | Goswami | H03K 3/011 327/257 |
| 2008/0031286 | A1 | 2/2008 | Alfano et al. | |
| 2010/0111218 | A1 * | 5/2010 | Chen, Jr. | H04L 25/0272 375/285 |
| 2011/0291702 | A1 * | 12/2011 | Kaeriyama | H04L 7/0008 326/62 |
| 2012/0091915 | A1 * | 4/2012 | Ilyes | H05B 37/0263 315/307 |
| 2012/0212277 | A1 * | 8/2012 | Roylance | G01P 3/46 327/308 |
| 2012/0320633 | A1 * | 12/2012 | Chen | H02M 3/33592 363/21.01 |
| 2012/0323423 | A1 * | 12/2012 | Nakamura | B60L 53/60 701/22 |
| 2013/0099817 | A1 * | 4/2013 | Haigh | H03K 19/003 326/21 |
| 2013/0182595 | A1 * | 7/2013 | Shimizu | H04W 24/00 370/252 |
| 2015/0146457 | A1 * | 5/2015 | Strijker | H02M 1/08 363/21.14 |
| 2015/0253396 | A1 * | 9/2015 | Derby | G01N 24/082 324/322 |
| 2016/0126780 | A1 * | 5/2016 | Bae | H02M 7/02 320/108 |
| 2016/0352267 | A1 * | 12/2016 | Sun | H02P 6/16 |
| 2017/0271904 | A1 * | 9/2017 | Ziv | H05B 37/0227 |
| 2018/0054135 | A1 * | 2/2018 | Ye | H02M 3/33569 |

OTHER PUBLICATIONS

"International Application Serial No. PCT/IB2016/001602, International Search Report dated Feb. 8, 2017", 4 pgs.
"International Application Serial No. PCT/IB2016/001602, Written Opinion dated Feb. 8, 2017", 6 pgs.

* cited by examiner

SYSTEM FOR POWER TRANSFER AND DUPLEX COMMUNICATION VIA SINGLE ISOLATION DEVICE

CLAIM OF PRIORITY

This patent application claims the benefit of priority of U.S. Provisional Patent Application Ser. No. 62/244,058, entitled, "CIRCUITS, SYSTEMS, AND METHODS FOR SIMULTANEOUSLY TRANSMITTING DATA SIGNALS, TIMING INFORMATION AND POWER THROUGH A TRANSFORMER", filed on Oct. 20, 2015, which is hereby incorporated by reference herein in its entirety.

TECHNICAL FIELD

This document pertains generally, but not by way of limitation, to isolation circuits and systems, and more particularly to isolation circuits and systems that allow power transfer and duplex communications via an isolation device.

BACKGROUND

Many applications require transmission of one or more of data, timing information or power between a first system and a second system, where the second system is designed to be isolated from the first system. In some cases, one or more of these types of signals may need to be transmitted in both directions between the two systems. Conventional approaches can transmit each of these types of signals using a separate isolator such as a transformer. However, these approaches are inefficient in terms of use of resources and provide corresponding poor performance. Therefore, a need exists for circuits, systems and methods to transmit one or more of data, timing information or power between isolated systems in a more efficient manner and with higher performance.

SUMMARY

The present inventors have recognized apparatus and methods for transferring power, clock and data between two isolated systems using a single isolation transformer. In addition, certain examples can allow full duplex data communication between the isolated systems using the single isolation transformer. In certain examples, the system can use a three-level coding scheme of positive and negative half-cycle waveforms and pauses. The pauses can separate the individual waveforms from each other such that the individual waveforms can be detected and decoded by the receiving circuit. Transmitted data, such as bit-values can be encoded by the transmitting circuit modulating a phase of the transmitted positive and negative half-cycle waveforms. In certain examples, one side of the isolation device can include circuitry to rectify at least a portion of the received signals and provide a power supply rail.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, hut not by way of limitation, various embodiments discussed in the present document.

DETAILED DESCRIPTION

Figure 1:
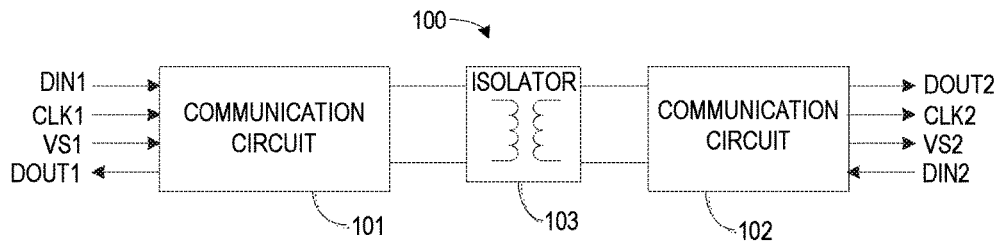
FIG. 1 illustrates generally an example system for transferring power, a clock signal and duplex data communication between two isolated systems using a single isolation transformer.

FIG. 1 illustrates generally an example system 100 for transferring power, a clock signal (CLK1) and duplex data communication between two isolated communication circuits 101, 102, or transceivers, using a single isolation device 103. The system 100 can include a first communication circuit 101, a second communication circuit 102 and an isolation device 103. In certain examples, the isolation device, or isolator, can include an isolation transformer 103 or the windings or antennas of a near field communication system. Other isolation devices are also possible without departing from the scope of the present subject matter and can include, but are not limited to, an inductive isolator, an optical isolator, a capacitive isolator, or combinations thereof.

In certain examples, the first communication circuit 101 can transmit a clock signal (CLK1) and a first data signal (DIN1) to the second communication circuit 102, and the second communication circuit 102 can transmit a second data signal (DIN2) to the first communication circuit 101. The second communication circuit 102 can receive and decode the transmitted signal of the first communication circuit 102 to provide a first received data signal (DOUT2) and a first received clock signal (CLK2). The first communication circuit 101 can receive and decode the transmitted data signal from the second communication circuit 102 and can provide a second received data signal (DOUT). In certain examples, the first communication circuit can receive power from a first voltage source (VS1) and the transmission signal of the first communication circuit 101 can provide power for a power supply (VS2) of the second communication circuit 102 as well as other components that may be associated with the second communication circuit 102. In certain examples, the power supply (VS2) of the second communication circuit 102 can be realized by rectifying the received signal and, in some examples, storing charge of the rectified signal on a battery or a capacitor. In certain examples, the exchange of data, the clock and power can all happen simultaneously or in a full duplex type mode as simultaneous transmission and reception is sometimes referred.

Figure 2:
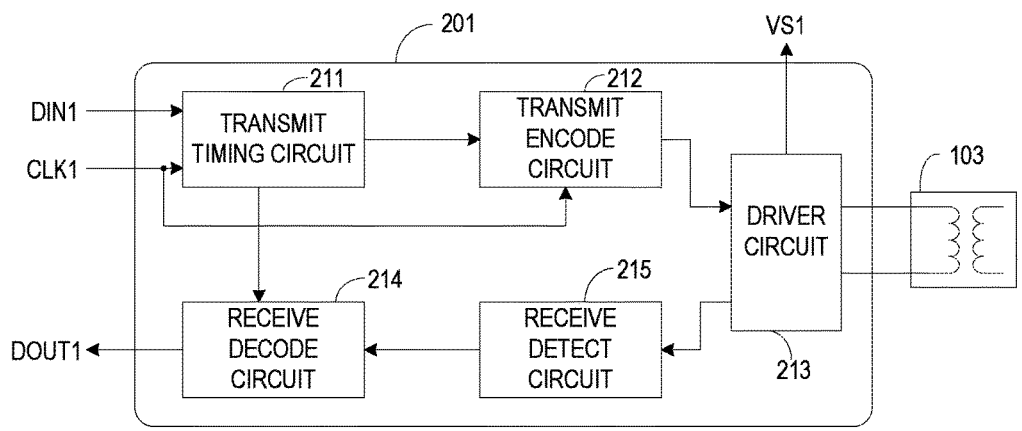
FIG. 2 illustrates generally a block diagram example of a first communication circuit.

FIG. 2 illustrates generally a block diagram example of a first communication circuit 201. The first communication circuit 201 can include an input to receive power from a first power supply (VS1), a transmit timing circuit 211, a transmit encode circuit 212, a driver circuit 213, a receive detection circuit 214 and a receive decode circuit 215. The transmit timing circuit 211 can receive a system clock (CLK1) and provide timing signals for the transmit encode circuit 212 and the receive decode circuit 215. The transmit encode circuit 212 can receive a data signal (DIN1) and can provide encode command signals to the driver circuit 213. The driver circuit 213 can receive the encode command signals and can generate and encode data on a cycle of an oscillatory transmit signal. In certain examples, one or more clock signals can be encoded with the transmit signal in either the frequency of each oscillatory cycle, including pauses between each cycle or in the frequency of each oscillatory cycle.

The receive detection circuit 214 can monitor loading of the transmit signal and generate encoded receive data signals based on the transmit signal loading. The receive decode circuit 215 can receive the encoded receive data signals from the receive detection circuit 214 and can provide a data output (DOUT1) using the encoded receive data signals and a clock signal received from the transmit timing circuit 211.

Figure 3:
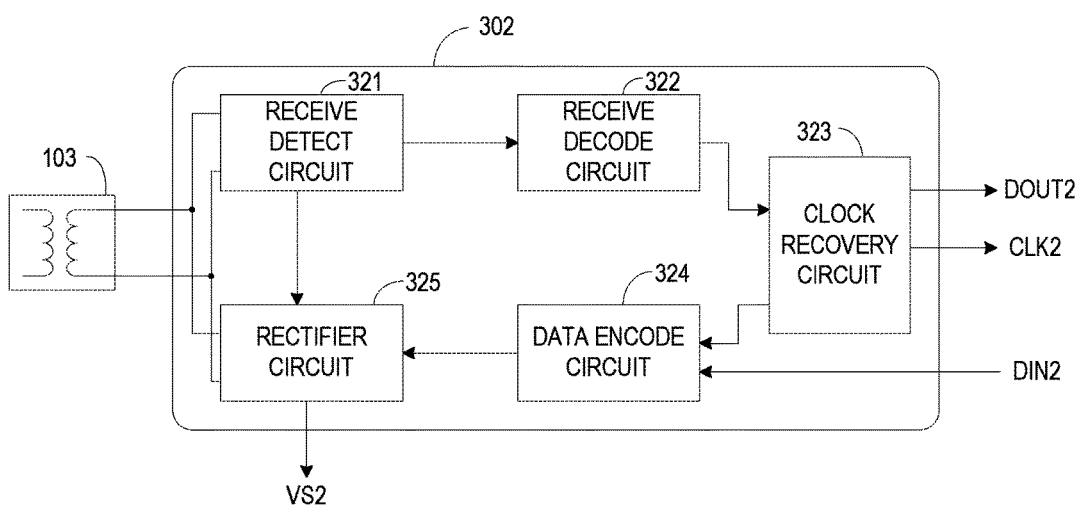
FIG. 3 illustrates generally a block diagram example of a second communication circuit.

FIG. 3 illustrates generally a block diagram example of a second communication circuit 302. The second communication circuit 302 can include a receive detection circuit 321, a receive decode circuit 322, a clock recovery circuit 323, a data encode circuit 324 and a rectifier circuit 325. The receive detection circuit 321 can be coupled to and can receive waveforms from the isolator 103. The receive detection circuit 321 can generate waveform information and pass the waveform information to the receive decode circuit 322. The receive decode circuit 322 can use the wave form information to decode the data transmitted from the first communication circuit and can pass detection information to the clock recovery circuit 324. The clock recovery circuit 324 can use the detection information to generate a recovered clock signal (CLK2) and associated delays that can be used for clock recovery such as delays associated with the clock pulse width for example. The data encode circuit 324 can receive input data (DIN2) and can generate rectification control commands using the clock signal (CLK2) encode data on the waveforms. The rectifier circuit 325 can receive the rectification commands and can load the isolator 103 to encode the input data on the waveforms of the isolator 103. In certain examples, the rectifier circuit 325 can transfer charge induced in the isolator 103 to provide a power supply (VS2) for the second communication circuit 302.

Figures 4A, 4B:
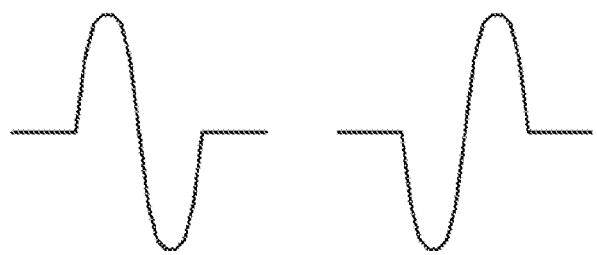
FIGS. 4A and 4B illustrate generally signals that can be generated by the first communication circuit.

FIGS. 4A and 4B illustrate generally signals that can be generated by the first communication circuit. The signals can transmit data, clock information and power in certain examples. With respect to data, FIGS. 4A and 4B each include a single cycle of an oscillating signal preceded by a pause and followed by a pause. The difference between the signal of FIG. 4A and the signal of FIG. 4B is the phase pattern of the cycle. Thus, the signal of FIG. 4A can illustrate a data bit having a first state and the signal of FIG. 4B illustrates a data bit having a second state. The second communication circuit can employ detection logic to detect a received cycle and decode logic to determine the phase pattern of the cycle. In certain examples, the system clock of the first communication circuit initiates each data bit transmission. Therefore, the second communication circuit includes logic to recover the clock signal by detecting, for example, a particular point of each received half-cycle. The signal waveforms of FIGS. 4A and 4B illustrate the voltage waveforms as they may appear at each side of the isolator.

Figures 5A, 5B:
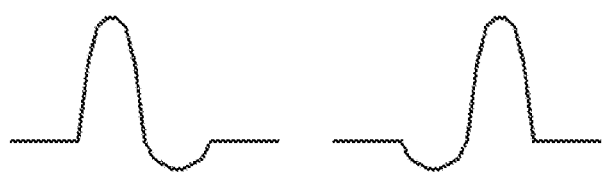
FIGS. 5A-5D illustrate generally example current signal waveforms that include data generated by the first communication circuit and data generated by the second communication circuit.
Figures 5C, 5D:
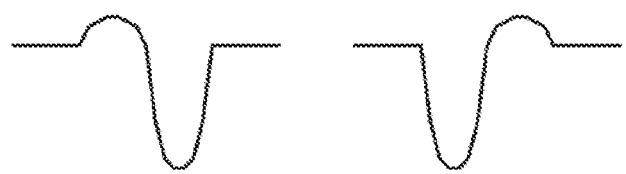

FIGS. 5A-5D illustrate generally example current signal waveforms that include data generated by the first communication circuit and data generated by the second communication circuit. The second communication system can generate a data bit state by loading the signal generated by the first communication system. In certain examples, FIGS. 5A and 5B illustrate current of the primary side of the isolator representing different loadings of a positive and negative polarity of the data signal to generate a first data state of a data bit, e.g., a selected one of a 1 or 0, from the second communication circuit back to the first communication circuit when the first communication circuit transmits a positive into negative voltage pulse or a negative into positive voltage pulse, respectively. FIGS. 5C and 5D illustrate current of the primary side of the isolator representing different loadings of the positive and negative polarities of the data signal to communicate a second data state, e.g., the other of the 1 or 0, from the second communication circuit back to the first communication circuit, when the first communication circuit transmits a positive into negative pulse or a negative into positive pulse, respectively. Consequently, FIGS. 5A-5D illustrate waveforms that can simultaneously communicate data information (full duplex) between the first communication circuit and the second communication circuit through a single isolator, such as a single transformer having a single, first, or primary, winding and a single, second, or secondary, winding, for example.

Figure 6:
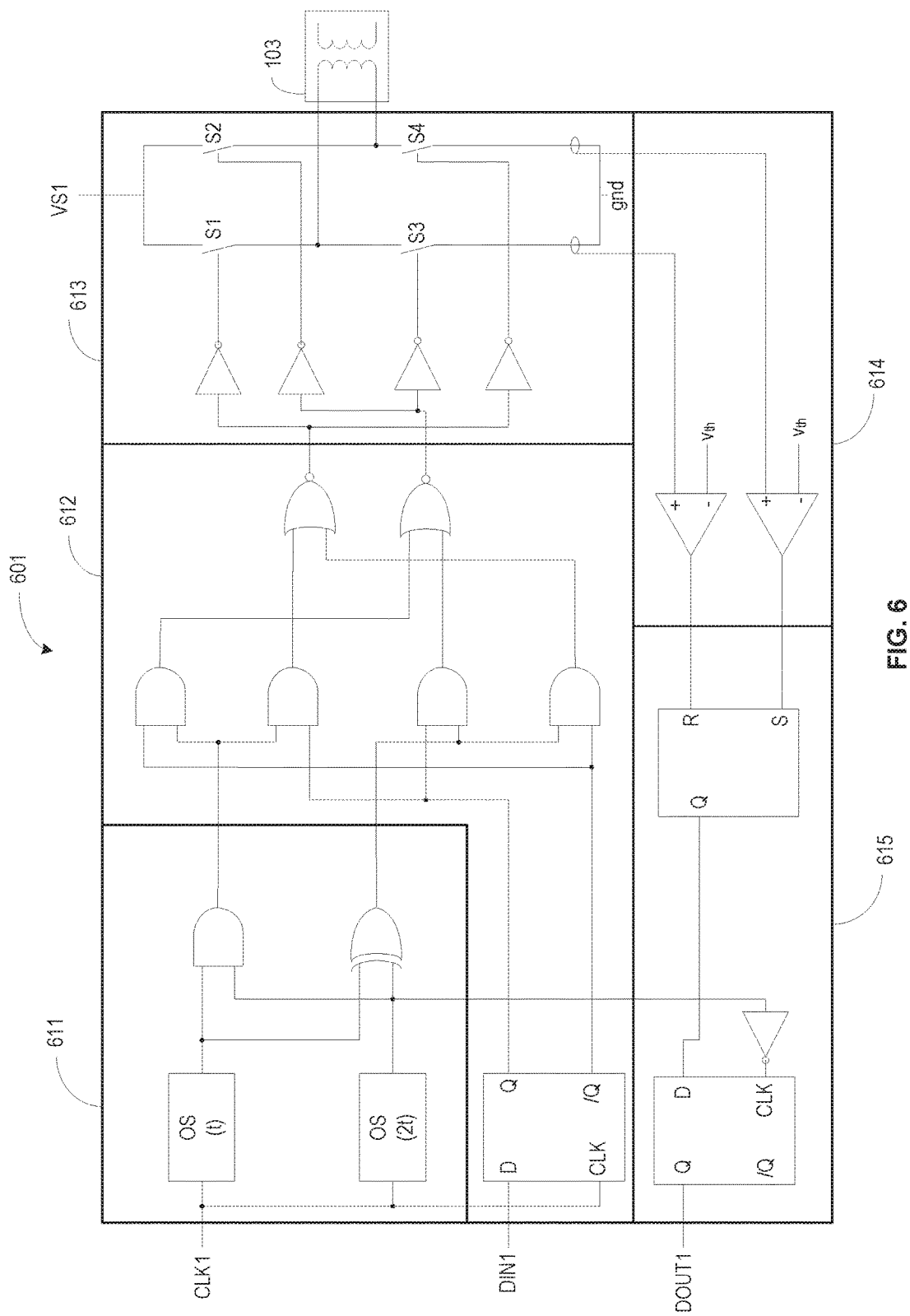
FIG. 6 illustrates generally an example circuit for the first communication circuit.

FIG. 6 illustrates generally a circuit diagram for an example first communication circuit 601. As discussed above with reference to FIG. 2, the first communication circuit 601 can include an input to receive power from a first power supply (VS1), a transmit timing circuit 611, a transmit encode circuit 612, a driver circuit 613, a receive detection circuit 614 and a receive decode circuit 615. The combination of the transmit timing circuit 611, the transmit encode circuit 612 and the driver circuit 613 can sometimes be referred to as a transmitter or transmit modulator. The combination of the receive detection circuit 614 and the receive decode circuit 615 can sometimes be referred to as a receiver.

In certain examples, the driver circuit 613 can generate a cyclical signal to drive the isolation element 103. In certain examples, the driver circuit 613 can include four switches (S1, S2, S3, S4) to supply current from a power supply (VS1), for example, to a first winding of an isolation transformer 103. When the first and fourth switches (S1, S4) are close, current can pass through the first winding in a first direction to generate, for example, a positive half-cycle. When the second and third switches (S2, S3) are closed simultaneously, current can pass through the first winding in a second direction to generate, for example, a negative half-cycle. In some examples, the driver circuit 613 can include optional inverting or non-inverting drivers to buffer the command signals or to provide proper driving control signals for the switches (S1, S2, S3, S4).

The transmit timing circuit 611 can receive a system clock (CLK1) and can provide timing signals for initiating a cycle transmission using the driver circuit 613, for timing the cycle and for receiving data from the second communication circuit. In certain examples, a frequency of the system clock (CLK1) can be commensurate with a bit frequency of the first communication circuit 601. In an example, the transmit timing circuit 613 includes two one-shots, an AND-gate and a XOR-gate. In general the transmit timing signals generate a first pulse from the AND-gate followed by a second pulse from the XOR gate. Each pulse has a duration (t). The first pulse is initiated on a rising edge of the clock signal (CLK) and the second pulse in initiated on the second edge of the first pulse. In the illustrated example, the rising edge of the clock can initiate a rising edge of the first timing pulse from the AND-gate. Upon the expiration of the first one-shot, the first timing pulse can transition from a high logic state to a low logic state. The falling edge of the first timing pulse can initiate a rising edge of the second timing pulse from the output of the XOR-gate. Upon the expiration of the second one-shot, the second timing pulse can transition from the high logic level to a low logic level.

The transmit encode circuit 612 can receive the data (DIN1) of the first communication device and the timing signals of the transmit timing circuit 611 and can provide the control signals for the driver circuit 613 such that when the data input to the transmit encode circuit is in a first state the positive and negative half-cycles can be transmitted in a first sequence and when the data input to the transmit encode signal is in a second state the positive and negative half-cycles can be transmitted in a second, opposite sequence. As is discussed below, the second communication circuit can decode the data transmitted from the first communication circuit by determining the half-cycle order of each received cycle. In certain examples, the transmit encode circuit 612 can include a latch, a four of AND-gates and two NOR gates. In certain examples, the latch can include a D flip-flop to receive and hold the logic level of the data of the first communication device. The AND-gates and NOR-gates can be arranged as shown to encode the order of the half-cycles of each transmitted cycle according to the logic level of the output of the latch. As illustrated in the example of FIG. 4, a high data logic level can be represented in a transmitted cycle with a positive half-cycle followed by a negative half-cycle (FIG. 4A) and a low data logic level can be represented in a transmitted cycle with a negative half-cycle followed by a positive half-cycle (FIG. 4B).

The receive detection circuit 614 can include a pair of current sensors and a corresponding pair of comparator amplifiers. The second communication circuit can communicate data to the first communication circuit 601 by loading the isolation transformer 103 while the first communication circuit 603 is transmitting data. The loading of the isolation transformer 103 can be detected by detecting a change, such as an increase, in current on the first winding of the isolation transformer 103. As such, the pair of current sensors detect current of the first winding. The first current sensor can detect first winding current during a positive half-cycle and the second current sensor can detect first winding current during a negative half-cycle. Each of the comparator amplifiers can receive a threshold (vth) indicative of the transition between the first winding being loaded and not loaded. The first comparator can provide an output indicative of whether the positive half-cycle was loaded by the second communication circuit and the second comparator can provide an output indicative of whether the negative half-cycle was loaded by the second communication circuit. Valid data transferred from the second communication circuit to the first communication circuit is detected when, simultaneously, the voltage at one terminal of the isolator is lower than the threshold voltage and the voltage at the other terminal of the isolator is higher than the threshold voltage.

The receive decode circuit 615 of the first communication device 603 can receive a timing signal from the transmit timing circuit 611 and the outputs from the comparators of the receive detection circuit 614 and can provide the logic level of the data (DOUT2) received from the second communication circuit. In certain examples, the receive decode circuit 615 can include an first latch, such as an RS latch, and a second latch. The first latch can receive the outputs of the receive detection circuit and can capture which half-cycle of the transmitted cycle of the first communication circuit was loaded by the second communication circuit. The output of the first latch can be received by the second latch and latched to the output of the receive decode circuit using the timing signal received from the transmit timing circuit.

Figure 7:
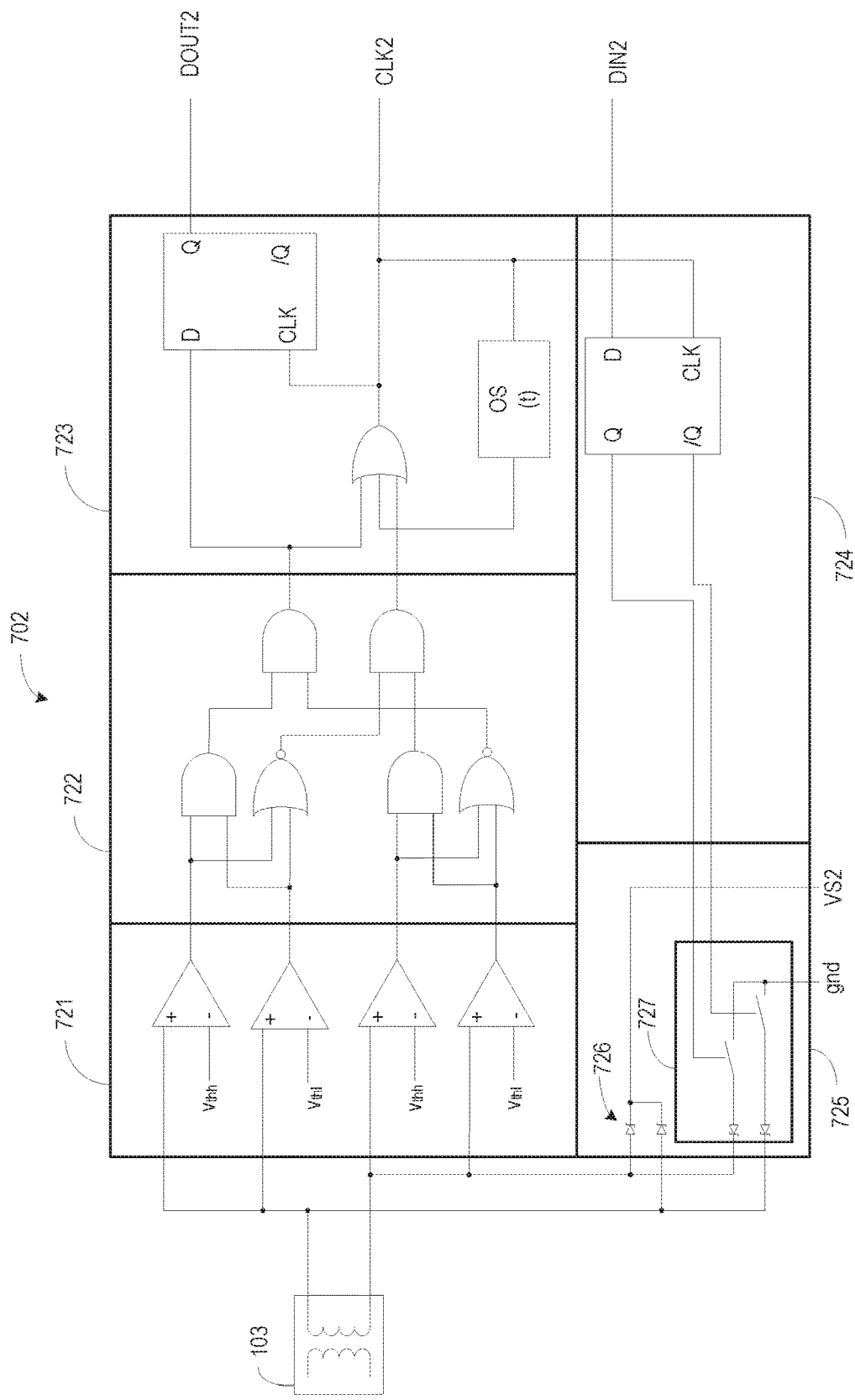
FIG. 7 illustrates generally an example circuit for the second communication circuit.

FIG. 7 illustrates generally an example circuit diagram of an example second communication circuit 702. As discussed above with reference to FIG. 3, the second communication circuit 702 can include a receive detection circuit 721, a receive decode circuit 722, a clock recovery circuit 723, a data encode circuit 724 and a rectifier circuit 725. The second communication circuit 702 can receive power, data and a clock signal from the first communication signal via an isolation device such as an isolation transformer 103.

In certain examples, the rectifier circuit 725 can include a rectifier 726 and a load circuit 727. The rectifier 726 can include a pair of diodes that can transfer charge from the second winding of the isolation transformer and store the charge on a power supply (VS2). The power supply (VS2) can include for example a capacitor or a battery for powering at least the second communication circuit 702. A first diode can transfer charge to the power rail (VS2) during a positive half-cycle of a received transmission from the first communication circuit and a second diode can transfer charge to the power supply (VS2) during a negative half-cycle of a received transmission from the first communication circuit. The load circuit 727 of the rectifier circuit 725 can allow the second communication device 702 to transmit data to the first communication device by selectively loading the second winding of the isolation transformer 103. In certain examples, the load circuit 727 can include a pair of diodes and a pair of switches. Control of the switches of the load circuit 727 is discussed below.

The receive detection circuit 721 can include four comparator circuits for detecting amplitude levels of each half-cycle of a received cycle transmission from the first communication device. Two of the comparators detect the logic level of a positive half-cycle and two comparators detect the logic level of a negative half-cycle. The illustrated example includes a two pairs of comparators to detect signal voltage on the second side of the isolator 103. Each pair of comparators can detect that a signal is above or below a low threshold ($v_{thl}$) and above or below a high threshold ($v_{thh}$). For purposes of the present subject matter, the combination of one pair of comparators detecting the voltage above the high threshold ($v_{thh}$) and the other pair of comparators detecting the voltage below the low threshold ($v_{thl}$) can provide the minimum information for receiving data and recovering a clock at the second communication circuit 702. It is understood that the four comparators of the receive detection circuit 721 can provide additional information including information about noise or differential voltages of the second winding of the isolator among other things.

The receive decode circuit 722 can receive the output of the receive detect comparators and can use a first logic array to indicate whether a logic level of the positive half-cycle was high or not and whether the logic level of the negative half-cycle was high or not. A second logic array can receive the outputs of the first logic array and can provide two outputs indicative of when the each half-cycle is received. In certain examples, the first logic array can include two pairs of logic gates with each pair including an AND-gate and a NOR-gate. The first pair of logic gates can receive the outputs of the two comparators that detect the logic level of the positive half-cycle, and the second pair of logic gates can receive the outputs of the two comparators that detect the logic level of the negative half-cycle. In certain examples, the second logic array can include a pair of AND gates. A first AND-gate of the pair of AND-gates can receive an output from each of the pair of gates of the first logic array. A first input of the first AND-gate can be coupled to an output of the AND-gate of the first pair of gates of the first logic array and a second input of the first AND-gate can be coupled to an output of the NOR-gate of the second pair of gates of the first logic array. A first input of the second AND-gate of the second logic array can be coupled to an output of the NOR-gate of the first pair of gates of the first logic array and a second input of the second AND-gate can be coupled to an output of the AND-gate of the second pair of gates of the first logic array. In certain examples, the output of the first AND-gate of the second logic array can indicate the logic level of the data received from the first communication circuit and the output of the second AND-gate of the second logic array can provide a complimentary indication the logic level of the data received from the first communication. In general, the outputs of the receive decode circuit are actively providing an indication of the received waveform during reception of the received waveform on the second winding of the isolation transformer and are inactive between transmissions of the first communication circuit.

The clock recovery circuit 723 can provide a first output indicative of the received data (DOUT2) and a second output indicative of the recovered system clock (CLK2) at the first communication device. Recapturing the clock signal can assist in timing the transmission of data from the second communication device 702. In certain examples, the clock recovery circuit 723 can include a latch, an OR-gate and a one-shot. In certain examples, the latch can receive either output of the received decode signal and latch it so the data is available to other processing circuitry associated with the second communication circuit. In the illustrated example of FIG. 7, the output of the first AND-gate of the second logic array of the received decode circuit is received at a D-latch of the clock recovery circuit. The OR-gate of the clock recovery circuit can receive the output of each AND-gate of the second logic array of the received decode circuit. Such an arrangement can provide at least the leading edge of the recovered clock signal because at least one of the inputs to the OR-gate triggers at each clock cycle. The output of the OR-gate can be provided to the latch of the clock recovery circuit to clock the latch. The output of the OR-gate can also be provided as an input to the one-shot of the clock recovery circuit. The one-shot of the clock recovery circuit provides a feedback input to the OR-gate to maintain the output of the OR-gate for a predetermined interval. In certain examples, the frequency of the system clock of the first communication system is known and the predetermined interval of the one-shot of the clock recovery circuit can be for example, one half of the period of the system clock. Such an interval can produce a clock signal with a 50% duty cycle. It is understood that other one-shot intervals are possible without departing from the scope of the present subject matter.

Control of the switches of the load circuit 727 can be based on control signal received from the data encode circuit 724. In certain examples, the data encode circuit 724 includes a latch, such as a D-flip-flop. Data (DIN2) can be received at an input of the latch and moved to the outputs of the latched when triggered by the recovered clock signal (CLK2). The outputs of the latch can provide the control signals for the switches of the load circuit 727. In certain examples, when a switch of the load circuit is activated, the switch can complete a circuit that couples the second side of the isolator to ground via a diode, such as a Zener diode. When the voltage on the winding breaks down the Zener diode junction, the second side of the isolator is loaded and increased current demand on the first side of the isolator can indicate the loading. Detecting the increased current demand on the first side of the isolator 103 can allow the duplex transfer of data across the isolator 103.

It is understood that the logic circuit examples of the figures discussed above are one example implementation of the functions discussed, and that upon reading and understanding the functions performed other logic circuit implementations are possible that can perform the described functions without departing from the scope of the present subject matter.

Additional Notes

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A transceiver configured to couple to an isolator and to receive power from a first device via the isolator and to provide duplex communication, the transceiver comprising:
    a receive decoder circuit coupled to the isolator, the receive decoder circuit including:
    a receive detection circuit configured to compare an oscillation cycle of first data received from the isolator with a plurality of thresholds and to provide a plurality of comparator outputs, the plurality of thresholds and comparator outputs configured to indicate reception of a positive half-cycle of the oscillation cycle and to indicate reception of a negative half-cycle of the oscillation cycle;
    a receive decoder configured to receive the plurality of comparator outputs, to identify an order of the positive half-cycle of the oscillation cycle and the negative half-cycle of the oscillation cycle and to provide an output indicative of logic level of the first data based on the order; and
    a rectifier circuit including a first diode circuit configured to rectify the oscillator cycle and transfer charge to a supply device of the transceiver, the supply device configured to provide power to the transceiver.

2. The transceiver of claim 1, including a transmitter configured to transmit second data during reception of the oscillation cycle of the first data, the transmitter including the rectifier circuit, the rectifier circuit configured to load the isolator during one of the positive half-cycle or the negative half cycle of the first data to transmit the second data.

3. The transceiver of claim 1, wherein the receive decoder is configured to provide a first output indicative of reception of the positive half-cycle and a second output indicative of reception of the negative half-cycle.

4. The transceiver of claim 3, including a clock recovery circuit including an OR-gate and configured to receive the first output and the second output at the OR-gate and provide a recovered clock signal at an output of the OR-gate.

5. The transceiver of claim 4, including a transmitter configured to transmit second data during reception of the oscillation cycle of the first data, the transmitter including a rectifier circuit configured to load the isolator during one of the positive half-cycle or the negative half cycle of the first data to transmit the second data.

6. The transceiver of claim 5, wherein the transceiver is configured to receive the second data;
    wherein the rectifier circuit includes:
    a first switch configured to load the positive half-cycle based on a first command signal; and
    a second switch configured to load the negative half-cycle based on a second command signal; and
    wherein the transmitter includes a latch configured receive the second data in response to the recovered clock signal and to provide the first command signal and the second command signal.

7. The transceiver of claim 6, wherein the rectifier circuit includes a first diode couple between the isolator and the first switch and a second diode coupled between the isolator and the second switch.

8. A method for providing duplex data communication and power transfer across a transformer isolator, the method comprising:
    receiving first data at a first transceiver having an output coupled to a first side of the transformer isolator;
    initiating oscillation of the output through one cycle based on a clock signal, the one cycle including a positive half-cycle and a negative half-cycle, wherein the order of the positive half-cycle and the negative half-cycle are indicative of the first data; and
    rectifying the one cycle at a rectifier circuit of a second transceiver, wherein the rectifying includes transferring charge to a power supply device of the second transceiver, the second transceiver coupled to a second side of the isolation transformer.

9. The method of claim 8, including:
    receiving second data at the second transceiver;
    loading the second side of the isolation transformer, using a rectifier circuit of the second transceiver, during the positive half-cycle of the one cycle or the negative half-cycle of the one cycle based on the second data.

10. The method of claim 8, including:
    receiving a representation of the one cycle at a second transceiver;
    detecting reception of the positive half-cycle;
    generating a first signal indicative of the reception of the positive half-cycle;
    detecting reception of the negative half-cycle;
    generating a second signal indicative of the reception of the negative half-cycle;
    receiving the first signal and the second signal at an OR-gate; and
    generating a recovered clock signal at an output of the Oft-gate.

11. The method of claim 10; including:
    triggering a one-shot using the output of the or-gate and receiving an output of the one-shot at an input of the OR-gate;
wherein a duration of the one shot is configured to define a pulse width of the recovered clock signal.

12. The method of claim 11, including:
receiving the first signal at a data input of a latch of the second transceiver;
receiving the recovered clock signal at a clock input of the latch;
providing an indication of the first data at an output of the latch based on an order of the reception of the first signal and the recovered clock signal.

\* \* \* \* \*

UNITED STATES PATENT AND TRADEMARK OFFICE
CERTIFICATE OF CORRECTION

PATENT NO. : 10,389,507 B2
APPLICATION NO. : 15/296653
DATED : August 20, 2019
INVENTOR(S) : Koch et al.

Page 1 of 1

It is certified that error appears in the above-identified patent and that said Letters Patent is hereby corrected as shown below:

On the Title Page

In Column 2, item (56), under "Other Publications", Line 1, delete "PCT IB2016 001602," and insert --PCT/IB2016/001602,-- therefor In the Claims In Column 10, Line 65, in Claim 10, delete "Oft-gate." and insert --OR-gate.-- therefor In Column 10, Line 66, in Claim 11, delete "10;" and insert --10,-- therefor Signed and Sealed this
Third Day of November, 2020

Andrei Iancu
*Director of the United States Patent and Trademark Office*